United States Patent Office 3,431,938
Patented Mar. 11, 1969

3,431,938
SURFACE MOUNT MIXING VALVE
Carl Sorensen and Age Molgard, Nordborg, Denmark, assignors to Danfoss A/S, Nordborg, Denmark, a company of Denmark
Filed May 27, 1966, Ser. No. 553,547
Claims priority, application Germany, May 28, 1965, D 47,378
U.S. Cl. 137—359                  2 Claims
Int. Cl. F16l 5/00

ABSTRACT OF THE DISCLOSURE

A surface mount decorative mixing valve and water outlet assembly having a removable front-accessible cover for mounting on a surface vertically thereon and against thereof. The mixing valve has a pair of inlet stubs for connection to hot and cold water inlets arranged at opposite sides of the mixing valve and symmetrical with respect thereto. A control shaft is disposed centrally between the two stubs. Outlet connections from the mixing valve are provided with valve means controlling water flow-therethrough. A pair of discharge outlets such as a faucet and shower outlet are provided. A cover extends over the mixing valve, inlet stubs and outlet valves and has a pair of slits to receive the discharge outlets. The cover has a top plate having openings for the control shafts of the mixing valve. The slits extend to the surface on which the assembly is mounted whereby the cover can be placed over the completely mounted and connected assembly, and condensation and leakage water may escape from its underside.

---

The present invention relates to a surface mount mixing valve and more particularly to such a mixing valve adapted for vertical installation against a wall in which the discharge faucets are brought out through the cover of the assembly.

It is difficult to provide water-tight connections of taps in plumbing fittings which close off the manually operable knobs to regulate temperature, or water quantity against the fixture, or against the wall. Particularly, when horizontally mounted mixing arrangements are used, it is practically impossible to provide seals for surface mounted covers for such assemblies which positively prevent water from entering below the covers while still enabling easy and light operation of the control levers.

The difficulty of preventing water from collecting beneath a mixing assembly, which water may enter either as a result of splashing, lack of tightness, or condensation from cold water pipes, can be avoided by mounting the mixing valve assembly vertically against the wall, and providing an opening permitting water which may inadvertently enter, to drain out. Such openings can at the same time provide space for the spouts for the water desired, thus enabling the construction of a simple, effective and decorative mixing valve assemby.

It is an object of the present invention to provide a mixing valve assembly which is not subject to damage by water collecting below a decorative cover, which can still be sealed against the wall to which it is applied, which is simple to manufacture, easily installed, and readily removable for service.

Briefly, in accordance with the present invention, a surface mount mixing valve and water outlet assembly is provided which has a removable, front-accessible cover, adapted to be mounted against a surface such as a wall against which a bathtub or sink is placed. A mixing valve assembly, as well known in the art, is provided with a pair of inlet stubs for connection to hot and cold water lines. The hot and cold water lines enter at opposed sides to the mixing valve. The mixing valve is arranged such that an outlet, or, if an additional connection for a shower for example is to be provided, a pair of outlets, are arranged parallel to the inlets, but staggered or offset with respect thereto. Each one of the outlets has a separate valve to control water flowing either to a spout or, for example, to a shower connection. A cover element is placed over the entire assembly which has a slot formed therein where the spout or, if desired, the shower outlet is provided. The slot receives the spout (and shower outlet) and is open against the wall, thus permitting drainage of leakage, or condensation water. The cover itself can be tightened against the wall by a final fastening nut applied to the mixing valve, or to the shut-off valves for the spout and the shower connection. The top, where there may be splashing, can thus be sealed against the wall while still permitting the escape of condensation water from the bottom.

In accordance with the preferred form of the invention, the inlet stubs, and the outlets from the mixing valve are offset laterally with respect to each other, as well as with respect to their distance from the wall. A union is interposed between the inlet stubs and the mixing valve, which union is as close to the mixing valve as possible. The valves for the spout, or the shower connection, are farther removed from the mixing valve and may be in line with the inlet connections. Thus, space is available for the insertion of tools to open the unions and remove, as an assembly, the mixing valve and the spouts for servicing or replacement. Preferably, shut-off valves, which may be screw driver operated, are inserted into the inlet stops just ahead of the union; alternatively, separate shut-off valves may be provided. Thus, a very compact and yet attractive and easily disassembled unit is provided.

The structure, organization and operation of the invention will now be described more specifically in the following detailed description with reference to the accompanying drawings, in which.

Figure 1:
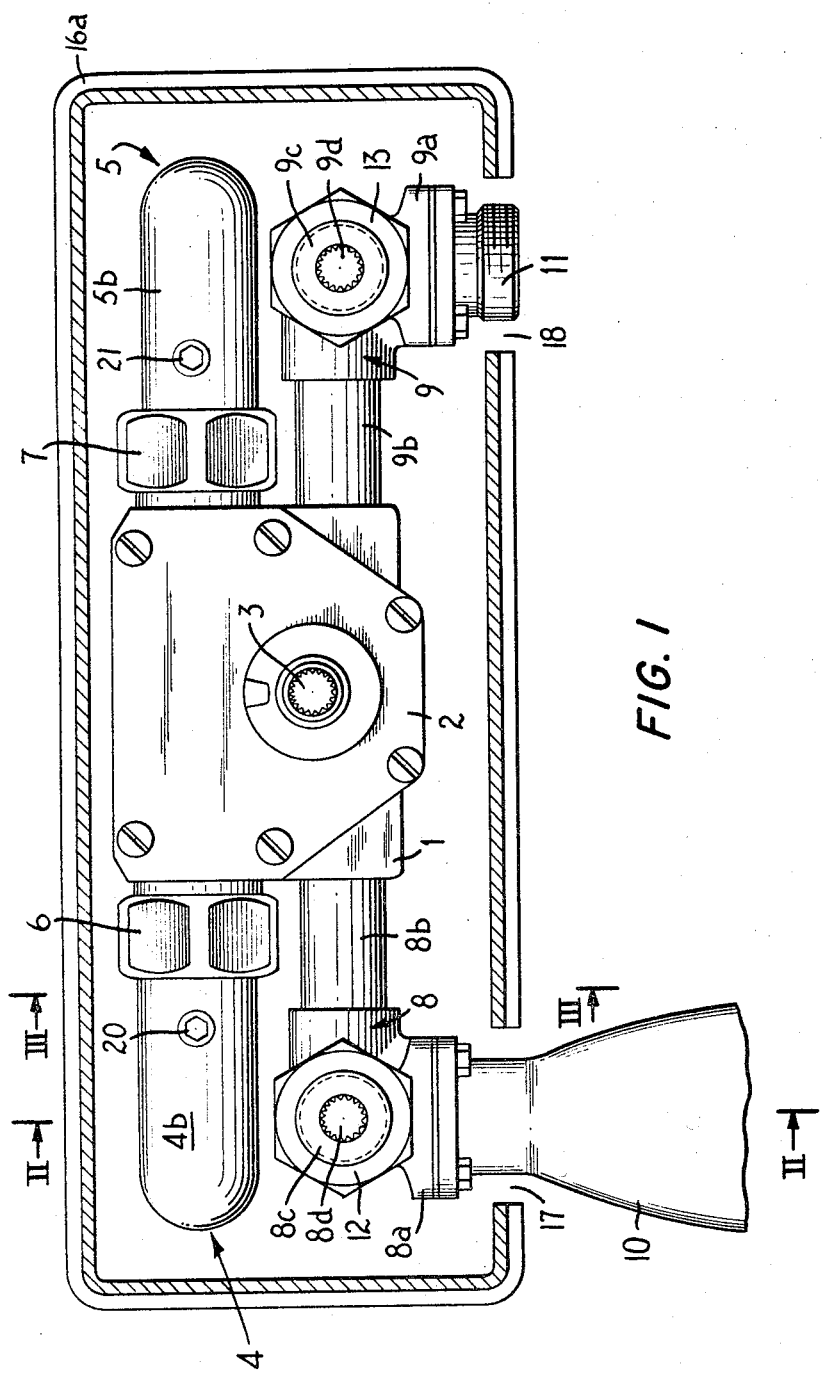
FIG. 1 is a front view of the mixing valve assembly, with control buttons removed and the cover cut along line I—I of FIG. 2.

The mixing valve and water outlet assembly has a mixing valve, as is well-known in the art, shown at numeral 1 in FIG. 1, closed off by a cover 2. Interiorly of the mixing chamber is a thermostatically operated mixing valve, which can be controlled by a shaft 3. Cold water is connected to the mixing valve over an elbow and inlet stub 4; hot water is applied over an elbow and inlet stub 5. Both stubs have a leg extending towards the wall; only leg 5a is visible in FIGS. 2 and 3. The other leg of the inlet stub is parallel to the wall and shown best in FIG. 1 at 4b, 5b. Both stubs are connected by unions 6, 7 to the mixing chamber 1. Unions 6, 7 are as close to the mixing chamber as possible. The inlet stubs 4, 5 further are preferably provided with tool-operable shut-off valves 20, 21.

Both sides of the mixing chamber 1 have outlet stubs 8, 9, formed of a short piece of tubing 8b, 9b soldered or brazed to the mixing chamber on the one hand and connected to an angle valve chamber 8a, 9a on the other. One of the valve housings 9a is provided with a connecting thread 11 for a hose, such as a hand shower connection. The valve housings 8a, 9a are provided with an insert sleeve 8c, 9c in which shafts 8d, 9d to operate the valve unit 8e, may turn. Insert sleeves 8c, 9c further are provided with cover nuts 12, 13. Each one of the control shafts 3, 8d, 9d contains an operating button or knob.

Figure 2:
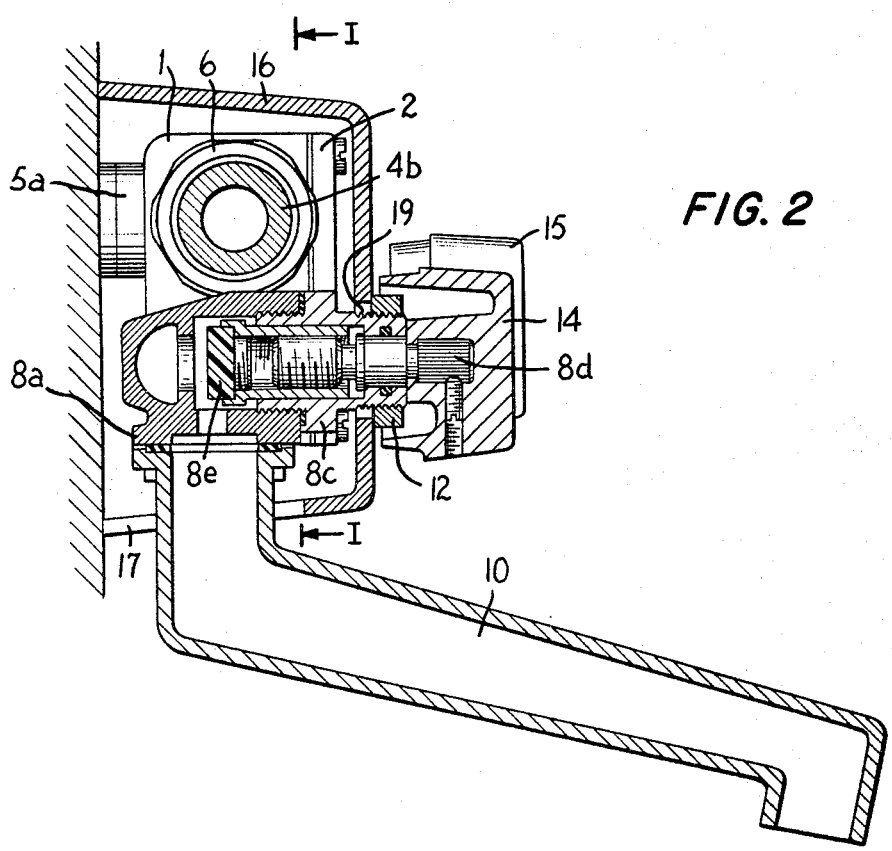
FIG. 2 is a cross-sectional view along the line II—II in FIG. 1.

FIG. 2 shows control knob 14 for the valve shaft 8d and control knob 15 for shaft 3 of the mixing valve itself.

The entire mixing valve and water outlet assembly is closed off by a cover element 16. Cover element, or cap 16 is formed, on its lower side (with respect to a vertical wall) with open slits 17, 18, so that the cap or cover element 16 can be pushed over the entire assembly, with the slits 17, 18 fitting over the spout 10 and the shower connection 11. On its front, cap 16 is formed with openings for the control shafts 3, 8d, 9d; FIG. 2 illustrates one such opening 19 for shaft 8d. The entire cover element 16 is secured against the wall surface by cap nuts 12, 13 screwed into or against sleeve 8c, 9c of the valves. Knobs 14, 15 hide the nuts from view.

Any water which might collect inside of the cover 16, due to leakage within the mixing valve, or the other valves, or due to condensation, may run off through slits 17, 18.

For assembly or disassembly, knob 15 for shaft 3, to control the temperature of the water; knob 14 to control shaft 8d, for the water spout; and knob 15 to control shaft 9d for the shower hose connection are removed. Then the holding nuts 12, 13 are unscrewed from elements 8c, 9c, respectively, and cover 16 can be slipped outwardly and away from the wall, thus exposing the entire assembly. Valves 20, 21 can be closed by means of a tool such as a wrench from the front. After closing of valves 20, 21 the mixing valve, together with its outlet stubs and the spout and hose connections can be removed.

Figure 3:
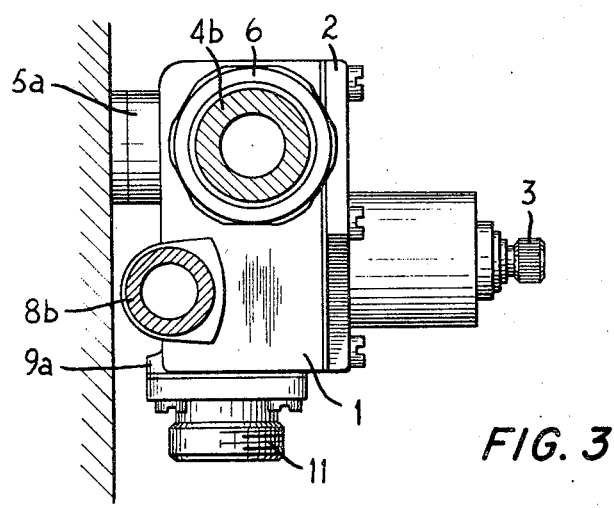
FIG. 3 is a cross-sectional view in the plane of the line III—III of FIG. 1, with the cap removed.

As shown in FIGS. 2 and 3, the inlet leg 4b is placed towards the front of the cover, that is is placed somewhat distant from the wall surface against which the entire assembly is to be mounted. The outlet stub 8 is placed closer to the wall. The back surfaces of the valve assemblies 8a, 9a likewise are close to the wall in order to decrease the extent of projection of the entire assembly. By placing the inlet stubs farther away from the wall, a wrench can readily be applied against unions 6, 7, and turned over a substantial angle, although the distance of the stubs 4b, 5b, is comparatively small. This is achieved by three features; the legs 4b, 5b are removed from the wall to such an extent that a standard wrench fitting on the standard union for the tube size employed can just be slipped between the wall and the tube. Secondly, the pipe stubs 8b, 9b is offset laterally, as well as to the front, to such an extent that the wrench can be turned over an angle of at least 120°, thus permitting rapid unscrewing of unions 6, 7. Thirdly, unions 6, 7 are placed close to the mixing valve whereas valve elements 8a, 9a, are placed offset sideways to again provide for clearance for operation of the wrench on unions 6, 7 and to avoid interference of the wrench with the valve housing. The entire assembly thus can be made of small dimension, while permitting disassembly and removal for repair or servicing of the mixing valve, and the water control valves as a unit, without the use of special tools. Outlet valves 8a, 9a are placed in a position beyond the mixing valve, so that the mixing valve is always filled with water, which is the most desirable condition for its functioning.

The lower wall of the cap, or cover 16 may be formed to slant slightly downwardly so as to insure that any water which may collect under the cap runs off.

To insure a seal of the cap or cover element 16 against the wall, at the topside, and to prevent water from running beneath the assembly, the sidewalls of the cap may be formed with a terminal edge 16a, as shown in FIG. 1. Such an edge can be sealed against the wall surface for example by means of a sealing compound well known in the art.

We claim:

1. Surface mount mixing valve and water outlet assembly comprising a removable front-accessible cover for mounting against a surface; a mixing valve having a pair of inlet stubs for connection to hot and cold water inlets arranged at opposite sides of said mixing valve and symmetrically with respect thereto, and a control shaft centrally between said stubs; at least one outlet connection from said mixing valve; valve means in said outlet connection controlling the flow of water therethrough and having a control shaft; a pair of water discharge means connected to said valve means each symmetrically arranged with respect to said mixing valve; said valve means comprising separate valve means for each discharge means, said cover extending around said mixing valve and inlet stubs and said outlet valve means and being formed with a pair of slits to receive respective ones of the water discharge means, and being formed with a top plate having openings for said control shafts of said mixing valve and said valve means, said slits extending up to said surface whereby the cover may be placed over the completely mounted and connected assembly, and condensation and leakage water may escape from the underside thereof.

2. Assembly as claimed in claim 1 wherein said inlet stubs have each a union and a shut-off valve inserted therein, said union being arranged immediately adjacent said mixing valve, and an elbow is integral with each said inlet stub for connection to supply piping; said outlet connection from said mixing valve to each said discharge means are parallel to said inlet stubs, offset with respect to said inlet stubs and located with respect to the cover element at a greater distance than said inlet stubs, the distance of said inlet stubs from said surface being at least as great as the jaw width of standard wrenches for the union size used to provide access to said union with standard disconnecting tools.

References Cited

UNITED STATES PATENTS

| | | | |
|---|---|---|---|
| 1,578,934 | 3/1926 | Stern | 137—342 |
| 1,946,207 | 2/1934 | Haire | 137—359 |
| 2,847,681 | 8/1958 | Jacobs | 4—187 |
| 2,878,489 | 3/1959 | Graham | 4—192 |
| 2,977,988 | 4/1961 | Drobilits et al. | 137—625.17 |
| 3,011,520 | 12/1961 | Barkelew | 137—597 XR |
| 3,034,138 | 5/1962 | Filliung | 4—148 |
| 3,172,426 | 3/1965 | Cole | 137—636.4 |

HENRY T. KLINKSIEK, *Primary Examiner.*